United States Patent [19]

Pospisil et al.

[11] Patent Number: 5,138,898
[45] Date of Patent: Aug. 18, 1992

[54] CORE ELEMENT JUNCTION BOX

[75] Inventors: Joseph Pospisil, Royal Oak; Michael V. Reasoner, Davison, both of Mich.

[73] Assignee: Teleflex Incorporated, Limerick, Pa.

[21] Appl. No.: 746,601

[22] Filed: Aug. 19, 1991

[51] Int. Cl.$^5$ .............................................. F16C 1/14
[52] U.S. Cl. ................................. 74/502.6; 74/500.5; 24/616; 24/136 L; 403/381
[58] Field of Search ............... 74/500.5, 502.5, 502.6, 74/501.5 R; 24/616, 136 L, 454; 403/381; 254/DIG. 14

[56] References Cited

U.S. PATENT DOCUMENTS 4,197,763  4/1980  Yamada .................... 74/501.5 R

FOREIGN PATENT DOCUMENTS 62-6863  1/1987  Japan .......................... 74/500.5
1-163810  6/1989  Japan .......................... 74/500.5

Primary Examiner—Richard Lorence
Assistant Examiner—William O. Trousdell
Attorney, Agent, or Firm—Reising, Ethington, Barnard, Perry & Milton

[57] ABSTRACT

A motion transmitting remote control cable assembly (10) includes a single piece junction box body (26) and a lid (30) having self-locking tangs, for automatically locking into engagement with the body upon the application of a compressive coupling force to the lid (30) and the body (26) for retaining the enlarged end (16) of a first core element (12) and the enlarged ends (16) of at least two other core elements (18,20). This junction box assembly (10) allows push-pull forces to be transmitted between the first core element (12) and the other core elements (18,20) in a confined environment.

21 Claims, 2 Drawing Sheets

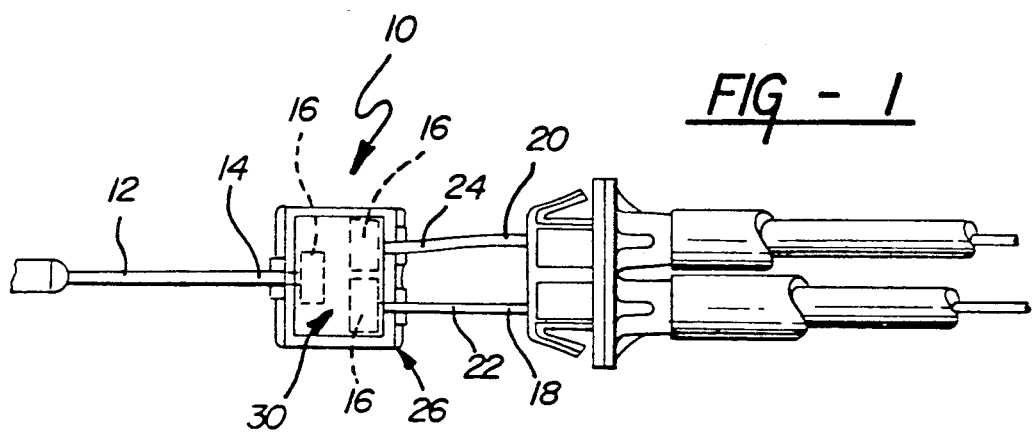
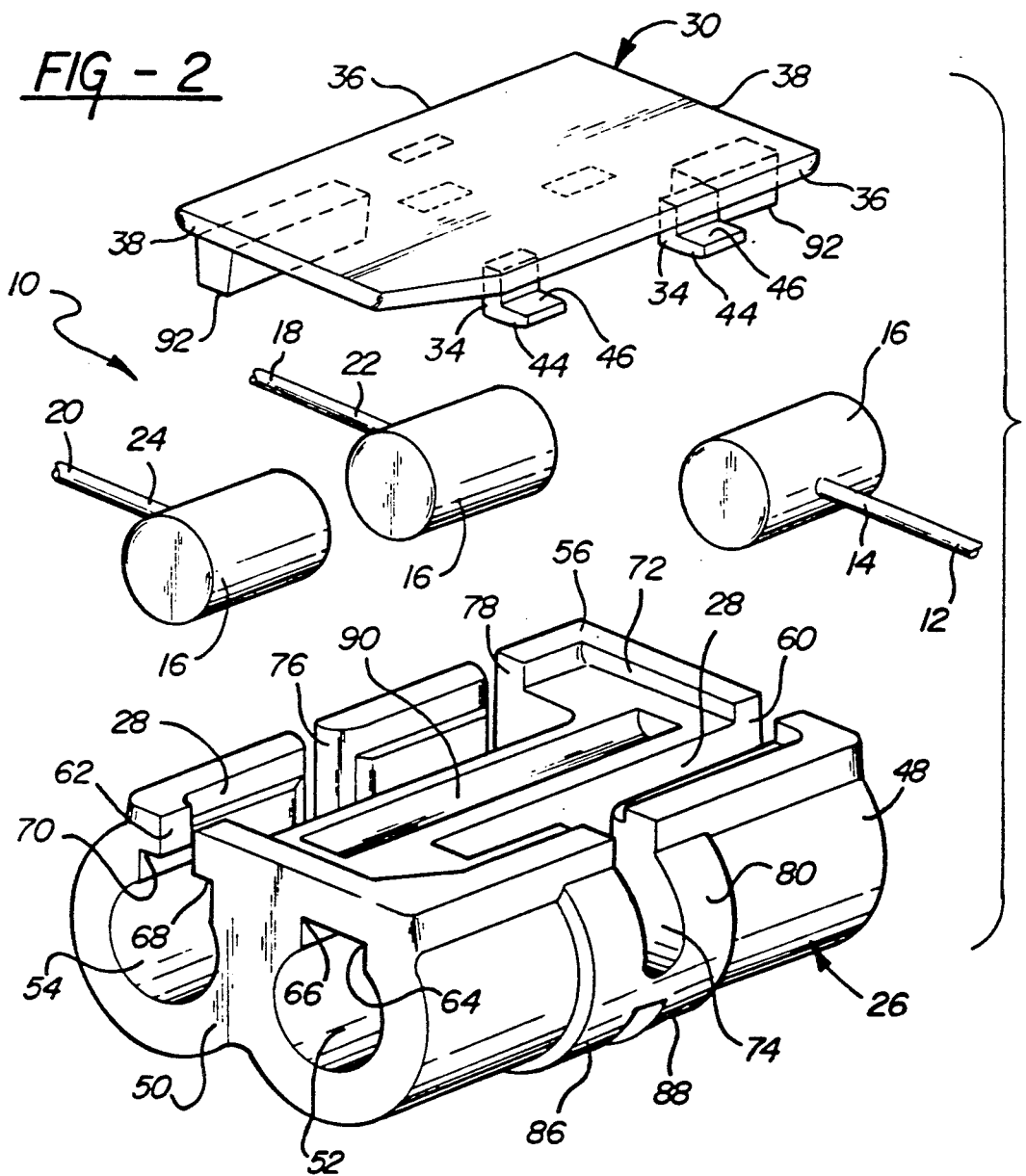

5,138,898

1

CORE ELEMENT JUNCTION BOX

TECHNICAL FIELD

The subject invention relates to motion transmitting remote control cable assemblies of the type for transmitting motion in a curved path by a flexible motion transmitting core element. The invention relates more specifically to a junction for joining a plurality of motion transmitting core elements.

BACKGROUND ART

In a number of push-pull environments it is necessary to transmit push-pull forces between a single core element and at least two other core elements. For example, a single actuator such as a gas pedal on a car may control several remote actuated mechanisms. For this purpose various junction assemblies have been devised which allow forces to be transmitted between the single core element and the plurality of core elements.

U.S. Pat. No. 4,197,763 to Yamada discloses a junction box for joining a single core element having an enlargement disposed thereon with a pair of core elements each having an enlargement disposed thereon. The Yamada junction box includes a body for receiving the core elements and for housing the adjustment means capable of adjusting tension in the core elements, and a lid attaching to the body by means of screws for retaining the enlargements, and therefore the ends of the core elements, within the body.

Unfortunately a body large enough to house adjustment means and receive screws is too large and unwieldy for certain applications. If the size of the body is reduced to a size that is acceptable for the application, the body cannot accommodate both the enlargements on the core elements and the screw receiving holes. There is simply not enough room. Thus, some other means of joining the lid to the body must be found.

SUMMARY OF THE INVENTION

A motion transmitting remote control cable assembly comprises a single core element having a first joining end with an enlargement disposed on the joining end and at least two other core elements having second and third joining ends, respectively, with an enlargement disposed on each of the second and third ends. The assembly further includes a single piece junction box body having receiving means disposed therein for receiving the first joining end of the single core element and the enlargement disposed thereon and the second and third joining ends of the other two core elements and the enlargements disposed on each of their respective ends. The assembly is characterized by self-locking lid means for automatically locking into engagement with the body to retain the enlargements within the receiving means upon application of a compressive coupling force to the lid and the body.

FIGURES IN THE DRAWINGS

Other advantages of the present invention will be readily appreciated as the same becomes better understood by reference to the following detailed description when considered in connection with the accompanying drawings wherein:

FIG. 1 is a top view of the assembly;

FIG. 2 is an exploded perspective view from above one side of the assembly;

2

Figure 3:
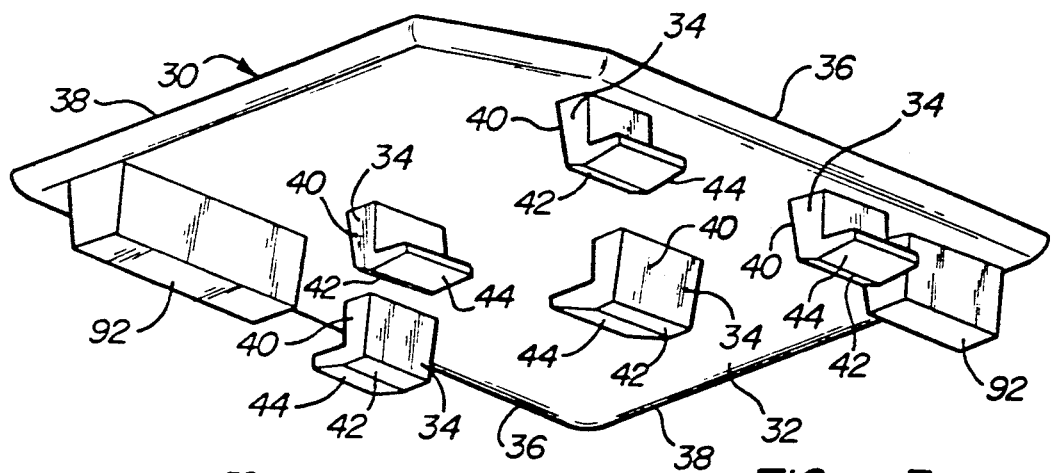

FIG. 3 is a perspective view from below the lid.

Figure 4:
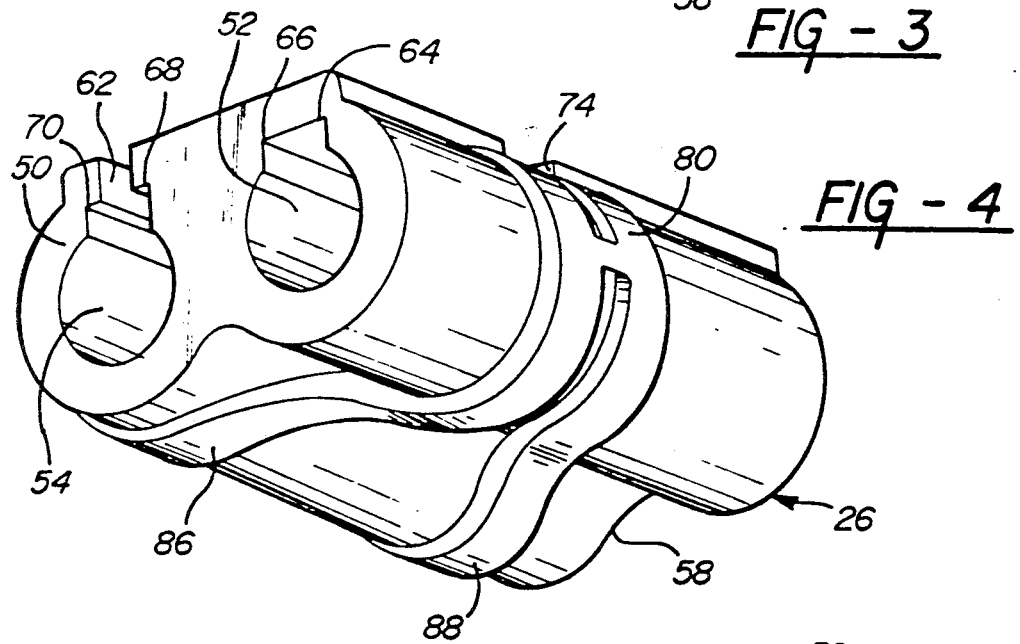

FIG. 4 is a perspective view of the body from below one of its sides; and

Figure 5:
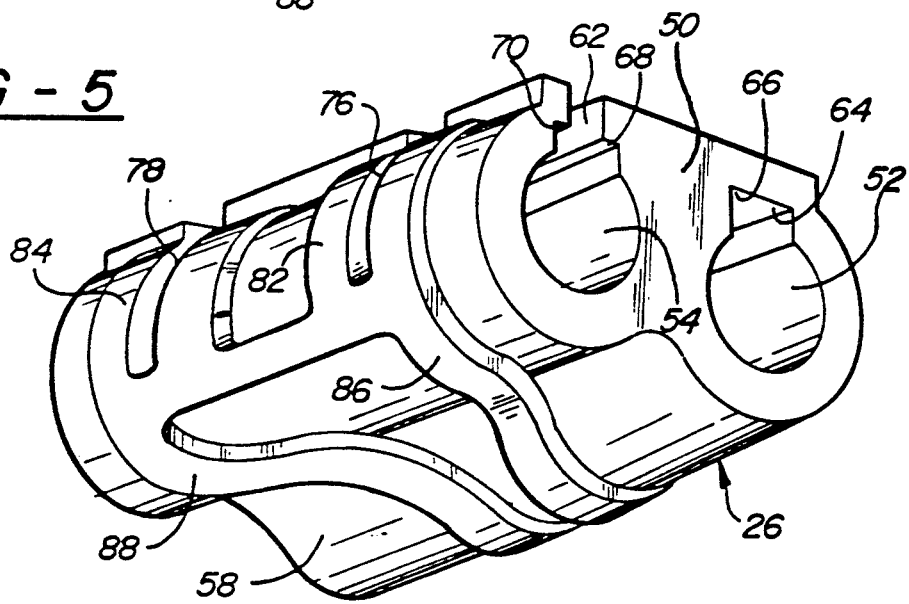

FIG. 5 is a perspective view of the body from below the other side.

DESCRIPTION OF THE PREFERRED EMBODIMENT

The motion transmitting remote control cable assembly generally shown at 10 comprises a first core element 12 having a first joining end 14 with an enlargement 16 disposed thereon and at least two other core elements 18,20 having second and third joining ends 22,24, respectively, with an enlargement 16 disposed on each of these second and third joining ends 22,24. The assembly 10 also includes a single piece junction box body generally indicated at 26 having receiving means 28 disposed therein for receiving the first joining end 14 of the first core element 12 and the enlargement 16 disposed thereon and the second and third joining ends 22,24 of the two other core elements 18,20 and the enlargements 16 disposed on each of their respective ends. The assembly 10 is characterized by including self-locking lid means generally indicated at 30 for automatically locking into engagement with the body 26 to retain the enlargements 16 within the receiving ends upon application of a compressive coupling force to the lid 30 and the body 26.

The lid 30 includes a lower surface 32 having locking tangs 34 protruding therefrom for engaging the body 26 and retaining the lid 30 to the body 26. These tangs 34 are formed to be integral with the body 26. The lid 30 has length longitudinal or long dimension edges 36 parallel to one another and width, crosswise or narrow dimension edges 38 parallel to one another defining a generally rectangular periphery. The tangs 34 each include a stem portion 40 extending perpendicularly or otherwise away from the lower surface 32 of the lid 30 toward a flange end 42, and a flange 44 disposed at the flange end 42 having a flange surface 46 extending away from the stem portion 40 toward the length edge 36 which is adjacent to the given tang 34. The lid 30 includes at least four of the tangs 34 with at least one of those tangs 34 disposed adjacent each of the length edges 36. The flanges 44 of these tangs 34 extend outwardly, or away from each other. The lid 30 also includes at least two other tangs 34 whose tang flanges 44 extend inwardly, or toward each other. In the preferred embodiment there are three tangs 34 having outwardly extending flanges 44: two of these tangs 34 are disposed on one side of the lid 30 adjacent one length edge 36; and one of these tangs 34 is disposed on the other side of the lid 30 adjacent the opposite length edge 36. Two other tangs 34 are disposed on the lid opposite to one another, having their flanges 44 extending inwardly and facing one another. These latter tangs 34 are set in from the length edges 36 more than the other three tangs whose flanges 44 extend outwardly.

The body 26 includes a first side 48 and a second side 50, a first cylindrical chamber 52 extending through the body 26 between the first and second sides, and a second cylindrical chamber 54 parallel to and spaced apart from the first chamber 52 and extending through the body 26 between the first and second sides. The body 26 also includes a top side 56 and a bottom side 58 and a first top slot 60 through the top side 56 of the body 26 to the first chamber 52 extending parallel to the first chamber 52 from the first side 48 toward the second side 50. The first top slot 60 does not reach the second side 50. There is also a second top slot 62 through the top side 56 of the body 26 to the second chamber 54 extending parallel to the second chamber 54 from the second side 50 toward the first side 48. The second top slot does not reach through to the first side 48. The body 26 includes a first receiving flange 64 disposed along the first chamber 52 adjacent the first top slot 60 through the body 26 for receiving one or more of the tang flanges. There is a second receiving flange 66 disposed along the first chamber 5 adjacent the first top slot 60 and opposite the first receiving flange 64. Further, there is a third receiving flange 68 disposed along the second chamber 54 adjacent the second top slot 62 through the body 26 for receiving one or more of the tang flanges. And finally, there is a fourth receiving flange 70 disposed along the second chamber 54 adjacent the second top slot 62 and opposite the third receiving flange 68 for receiving one or more of the tang flanges. These receiving flanges are generally parallel to the top and bottom sides 56,58: they are not angled. The first and fourth receiving flanges 64,70 are located near the outside of the body 26, while the second and third receiving flanges 66,68 are located more toward the inside of the body 26.

The body 26 also has a receiving depression 72 in the portion of the top side 56 for receiving the lid 30 so that the top of the lid is flush with the top of the body 26 and the lid 30 is received into the depression 72.

There is a first side slit 74 through the body 26 to the first chamber 52 extending from the first top slot 60 toward the bottom of the body 26. The first side slit 74 is located halfway between the first and second sides. It extends halfway from the top side 56 of the body 26 to the bottom side 58 of the body 26. There is also a second side slit 76 and a third side slit 78 spaced apart from the second side slit 76, both formed through the body 26 to the second chamber 54 extending from the second top slot 62 toward the bottom of the body 26. The second side slit 76 is disposed about one third of the way between the second side 50 and the first side 48, while the third side slit 78 is about two thirds of the way between the second side 50 and the first side 48. Each of these slits extend halfway between the top side 56 of the body 26 and the bottom side 58.

There is also a first reinforcing wall 80 integral with the body 2 and extending around the first side slit 74, a second reinforcing wall 82 integral with the body 26 and extending around the second side slit 76 and a third reinforcing wall 84 integral with the body 26 and extending around the third side slit 78. These reinforcing walls have a "U" shape: in other words they do not extend completely around the slits. The tops of the slits 74,76,78 remain open for the core elements to pass through.

A first reinforcing rib 86 formed as part of the body 26 extends from the first reinforcing wall 80 over the bottom side 58 of the body 26 to the second reinforcing wall 82. A second reinforcing rib 88 formed as part of the body 26 extends from the first reinforcing wall 80 over the bottom side 58 of the body 26 to the third reinforcing wall 84. These reinforcing ribs 86,88 resist the deforming of the body 26 by external forces. The specific orientation of the reinforcing ribs 86,88 is dictated by the tensile stresses which pass through the body 26 upon application of tensile forces in the core elements 12, 18, 20. Specifically, the ribs 86,88 are designed by calculating the minimum wall thicknesses necessary to withstand the maximum anticipated tensile loads. This calculated wall thickness is used to size the ribs 86,88, with the placement of the ribs extending on opposite sides of the first side slit 74 straight to the second 76 and third 78 side slits, respectively, as shown in FIGS. 4 and 5.

A semi-cylindrical depression 90 is disposed between and parallel to the first and second chambers 52,54 and extends down from the receiving depression 72 toward the bottom of the body 26. This depression 90 is quite shallow, being only a few millimeters deep. The semicylindrical depression 90 serves to commonize or help make uniform the wall thickness of the body 26 during molding.

The lid 30 further includes at least two locating bars 92 integral with the lid 30, protruding from the lower surface 32 of the lid 30, at least on of the locating bars 92 engaging within each of the top slots 60,62 located in the body 26. The protruding bars 92 are generally placed in the slots 60,62 adjacent to the sides from which the slots extend. In other words, one bar 92 sits in the first slot 60 adjacent the first side 48, while the other bar 92 sits in the second slot 62 adjacent the second side 50. These protruding bars 92 serve to maintain a minimum width of the slots 60,62 when the body 26 is subject to deforming forces. This is necessary because if the slots 60,62 become too deformed, the tangs 34 may pop out of engagement with the body 26 and the lid 30 may separate from the body 26.

The lid 30 has a pentagonal periphery having three right angled corners. In other words, the lid 30 has a generally rectangular periphery, except that one of the four corners has been "cut out" to form the fifth side. The depression having this identical shape 72 is disposed on the upper surface of the body 26 for receiving the lid 30. The sole purpose of using this shape for the lid 30 and the depression 72 is to assist the assembler in locating the lid 30 in the depression 72.

The body 26 and the lid 30 are made from hard plastic.

The core elements 12,18,20 can be any flexible cable or cable assembly which can transmit push-pull motion in a curve path. The enlargements 16 which are fixed on the joining ends 14,22,24 of these core elements 12,18,20 are generally cylindrical in shape. The enlargements 16 are attached to the core elements so that the axis of the core element is generally perpendicular to the axis defined by the cylindrical enlargement 16. The core element also joins the enlargement 16 roughly half way along the length of the cylindrical enlargement 16.

In operation, the enlargement 16 on the first joining end 14 is slid into the first chamber 52 of the body 26 from the first side 48. The first joining end 14 of the first core element 12 can move along the body 26 from the first side 48 toward the second side 50 through the first top slot 60. When the enlargement 16 is properly located, the first joining end 14 can pivot about the axis defined by the enlargement to fit into the first side slit 74. Next, the enlargement 16 on the second joining end 22 is inserted into the second chamber 54 from the second side 50. The second joining end 22 is free to move through the second top slot 62 toward the first side 48. When this enlargement 16 is properly positioned, the second joining end 22 can pivot to fit into the third side slit 78. Finally, the enlargement 16 on the third joining end is slid into the second chamber 54 behind the enlargement 16 on the second joining end. The third joining end 24 is free to move through the body 26 via the second top slot 62. When the enlargement 16 is positioned properly, the third joining end 24 can pivot to fit into the second side slit 76. At this point the core elements all extend from the sides of the body 26. One enlargement 16 is in the first chamber 52 and two enlargements 16 are in the second chamber 54. The lid 30 can be lowered into position and snapped into engagement with the body 26 in the receiving depression 72. Two of the tangs 34 having outwardly extending flanges 44 engage with the first receiving flange 64, while one other tang 34 having the outwardly extending flange engages with the fourth receiving flange 70. One of the tangs 34 having the inwardly extending flanges 44 engages the second receiving flange 66 on the body 26, while another tang 34 having the inwardly extending flange 44 engages the third receiving flange 68 on the body 26. All of the tang flange surfaces 46, once engaged with the receiving flanges 64,66,68,70, positively retain the lid 30 to the body 26. This, in turn, seals off the top slots 60,62, retaining the enlargements 16 within the body 26.

The junction assembly 10 is very simple to use. Moreover, it can be utilized in very tight or cramped environments—such as behind a gas pedal in a car. Finally, it is very effective in linking a single core element to two or more others for transmitting push-pull forces.

The invention has been described in an illustrative manner, and it is to be understood that the terminology that has been used is intended to be in the nature of words of description rather than of limitation.

Obviously, many modifications and variations of the present invention are possible in light of the above teachings. It is therefore to be understood that within the scope of the appended claims wherein reference numerals are merely for convenience and are not to be in any way limiting, the invention may be practiced otherwise than is specifically described.

We claim:

1. A motion transmitting remote control cable assembly (10) comprising:
   a first core element (12) having a first joining end (14) with a cylindrical enlargement (16) disposed on said first joining end (14) and extending transversely of said first core element;
   at least two other core elements (18,20) having second and third joining ends (22,24) respectively, with a cylindrical enlargement (16) disposed on each of said second and third joining ends and extending transversely of said second and third core elements;
   a single piece junction box body (26) having a first side (48) and a second side (50), and including receiving means (28) for receiving into said body said first joining end (14) of said first core element and said cylindrical enlargement (16) disposed thereon and said second and third joining ends (22,24) of said two other core elements (18,20) and said cylindrical enlargements (16) disposed on each of their respective ends;
   a self-locking lid (30) for automatically locking into engagement with said body (26) to retain the enlargements (16) within said receiving means (28) upon application of a compressive coupling force to said lid (30) and said body (26),
   said receiving means including a first cylindrical chamber (52) defined by said body (26) extending through said body between said first and said second sides (48,50) and a second cylindrical chamber (54) defined by said body (26) parallel to and spaced apart from said first chamber (52) and extending through said body between said first and second sides (48,50), said cylindrical enlargement (16) of said first core element (12) disposed in said first cylindrical chamber (52) and said cylindrical enlargements (16) of said second and third core elements (18,20) being disposed in end-to-end relationship in said second cylindrical chamber (54).

2. An assembly (10) as set forth in claim 1 further characterized by said body (26) including a top side (56) and a bottom side (58) and a first top slot (60) through said top side (56) of said body (26) to said first chamber 52 extending parallel to said first chamber from said first side (48) toward said second side (50).

3. An assembly (10) as set forth in claim 2 further characterized by said body (26) including a second top slot (62) through said top side (56) of said body (26) to said second chamber (54) extending parallel to said second chamber (54) from said second side (50) toward said first side (48).

4. An assembly (10) as set forth in claim 3 further characterized by including a first side slit (74) through said body (26) to said first chamber (52) extending from said first top slot (60) toward said bottom of said body (26).

5. An assembly (10) as set forth in claim 4 further characterized by including a second side slit (76) and a third side slit (78) spaced apart from said second side slit (76) both formed through said body (26) to said second chamber (54) extending from said second top slot (62) toward said bottom of said body (26).

6. An assembly (10) as set forth in claim 5 further characterized by including a first reinforcing wall (80) integral with said body (26) and extending around said first side slit (74), a second reinforcing wall (82) integral with said body (26) and extending around said second side slit (76) and a third reinforcing wall (84) integral with said body (26) and extending around said third side slit (78).

7. An assembly (10) as set forth in claim 6 further characterized by including a first reinforcing rib (86) formed as part of said body (26) extending from said first reinforcing wall (80) over said bottom of said body (26) to said second reinforcing wall (82).

8. An assembly (10) as set forth in claim 7 further characterized by including a second reinforcing rib (88) formed as part of said body (26) extending from said first reinforcing wall (80) over said bottom of said body (26) to said third reinforcing wall (84).

9. An assembly (10) as set forth in claim 8 further characterized by said body (26) including a receiving depression (72) in a portion of said top side (56) for receiving said lid (30) so that said top of said lid (30) is flush with said top of said body (26) when said lid (30) is received into said depression.

10. An assembly (10) as set forth in claim 9 further characterized by said lid (30) including a lower surface (32) having locking tangs (34) protruding from said lower surface (32) for engaging said body (26) and retaining said lid (30) to said body (26).

11. An assembly (10) as set forth in claim 10 further characterized by said lid (30) having length edges (36) parallel to one another and width edges (38) parallel to one another defining a generally rectangular periphery.

12. An assembly (10) as set forth in claim 11 further characterized by said tangs (34) each including a stem portion (40) extending away from said lower surface (32) of said lid (30) toward a flange end (42), and a flange (44) disposed at said flange end (42) having a flange surface (46) extending away from said stem portion (40).

13. An assembly (10) as set forth in claim 12 further characterized by said lid (30) including at least four of said tangs (34) with at least one of said tangs (34) disposed adjacent each of said length edges (36) and having said flange surfaces (46) extending outwardly and away from each other, and with at least two of said tans (34) disposed opposite one another and having said flange surfaces (46) extending inwardly and toward each other.

14. An assembly (10) as set forth in claim 13 further characterized by said lid (30) including at least two locating bars (92) protruding from said lower surface (32) of said lid (30) at least one of said locating bars (92) engaging within and extending completely across each of said slots (60,62).

15. An assembly (10) as set forth in claim 14 further characterized by said body (26) including a first receiving flange (64) disposed along said first chamber (52 adjacent said first top slot (60) for receiving one or more of said tang flanges (44) which extend outwardly.

16. An assembly (10) as set forth in claim 15 further characterized by said body (26) including a second receiving flange (66) disposed along said first chamber (52) adjacent said first top slot (60) and opposite said first receiving flange (64) for receiving one or more of said tang flanges (44) which extend inwardly.

17. An assembly (10) as set forth in claim 16 further characterized by said body (26) having a third receiving flange (68) disposed along said second chamber (54) adjacent said second top slot (62) for receiving one or more of said tang flanges (44) which extend outwardly.

18. An assembly (10) as set forth in claim 17 further characterized by said body (26) including a fourth receiving flange (70) disposed along said second chamber (54) adjacent said top slot and opposite said third receiving flange (68) for receiving one or more of said tang flanges (44) which extend inwardly.

19. An assembly (10) as set forth in claim 18 further characterized by said lid (30) having a pentagonal periphery having three right angled corners.

20. An assembly (10) as set forth in claim 19 further characterized by said body (26) and said lid (30) being made from hard plastic.

21. An assembly (10) as set forth in claim 20 further characterized by including a semicylindrical impression (90) disposed between and parallel to said first and second chambers (52,54), and extending down from said receiving depression (72) toward said bottom of said body (26).

* * * * *